US012311322B1

(12) United States Patent
Browe et al.

(10) Patent No.: US 12,311,322 B1
(45) Date of Patent: May 27, 2025

(54) MOF-CLAY-POLYMER COMPOSITE MEMBRANE WITH DISPERSED FILLER CONSTITUENTS AND ANISOTROPICALLY-ORIENTED CLAY PLATELETS

(71) Applicant: U.S. Army Combat Capabilities Development Command, Chemical Biological Center, APG, MD (US)

(72) Inventors: Matthew A Browe, Bel Air, MD (US); John M. Landers, Riverton, NJ (US); Alex Balboa, Bel Air, MD (US); Wesley O. Gordon, Belcamp, MD (US)

(73) Assignee: The Government of the United States as Represented by the Secretary of the Army, Washington, DC (US)

( * ) Notice: Subject to any disclaimer, the term of this patent is extended or adjusted under 35 U.S.C. 154(b) by 432 days.

(21) Appl. No.: 17/838,600

(22) Filed: Jun. 13, 2022

Related U.S. Application Data

(60) Provisional application No. 63/213,175, filed on Jun. 21, 2021.

(51) Int. Cl.
  *B01D 71/02* (2006.01)
  *B01D 69/02* (2006.01)
  *B01D 69/12* (2006.01)
  *B01D 71/52* (2006.01)
  *C08J 3/20* (2006.01)
  *C08J 5/18* (2006.01)

(52) U.S. Cl.
  CPC .......... *B01D 71/024* (2013.01); *B01D 69/02* (2013.01); *B01D 69/1214* (2022.08); *B01D 71/5211* (2022.08); *C08J 3/20* (2013.01); *C08J 5/18* (2013.01); *B01D 2325/20* (2013.01); *C08J 2371/02* (2013.01)

(58) Field of Classification Search
  CPC .. B01D 71/024; B01D 69/02; B01D 69/1214; B01D 71/5211; B01D 2325/20; C08J 3/20; C08J 5/18; C08J 2371/02
  USPC ............................................ 210/500.27, 490
  See application file for complete search history.

(56) References Cited

U.S. PATENT DOCUMENTS 10,363,546 B2 * 7/2019 Song ........................ B01J 20/20

* cited by examiner

*Primary Examiner* — Madeline Gonzalez
(74) *Attorney, Agent, or Firm* — Timothy M. Barlow

(57) ABSTRACT

A composite membrane and method of making the same, wherein the membrane includes a polymer component; an impermeable clay-platelet filler component; and a permeable metal-organic framework filler component combined with the polymer component and the impermeable clay-platelet filler component to form a film. The impermeable clay-platelet filler component includes an anisotropic orientation aligned parallel to a surface of the film. The polymer component includes polyethylene oxide. The polyethylene oxide includes a viscosity-averaged molecular weight of $10^6$ g/mol. The impermeable clay-platelet filler component includes hydrous magnesium silicate clay. The permeable metal-organic framework filler component includes UiO-66-$NH_2$. The film includes a water vapor transport rate of 35 g/m$^2$/hr. The impermeable clay-platelet filler component includes an aspect ratio having a ratio of diameter to thickness of 10 to 1 or greater. The impermeable clay-platelet filler component and the permeable metal-organic framework filler component each has at least a 20 weight percent of the film.

8 Claims, 22 Drawing Sheets

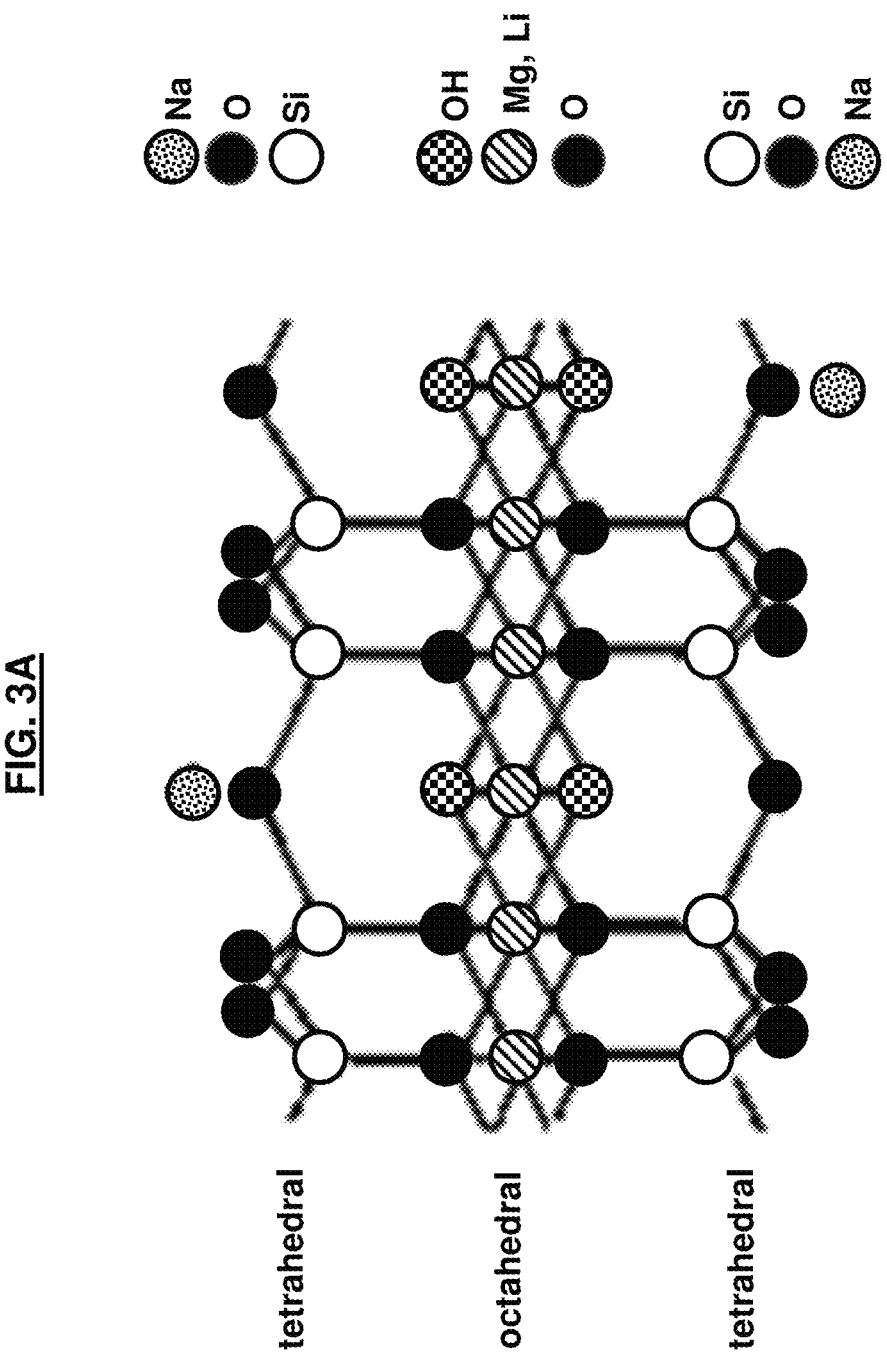

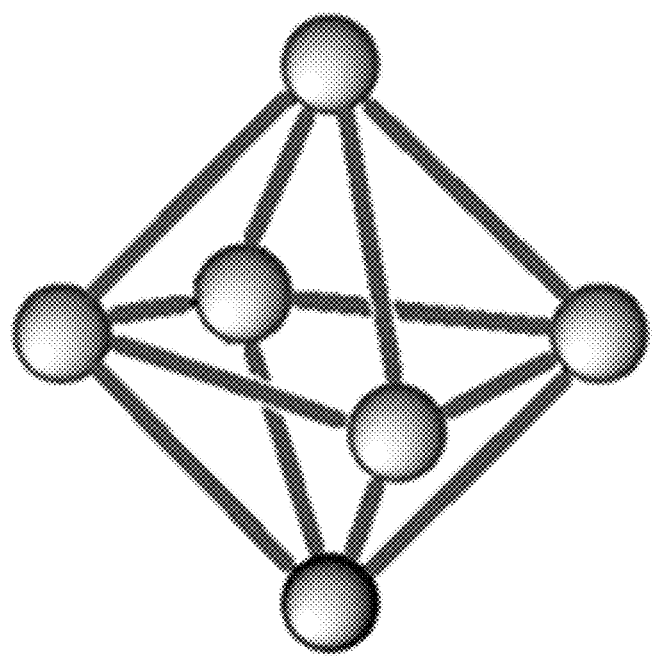
FIG. 3B
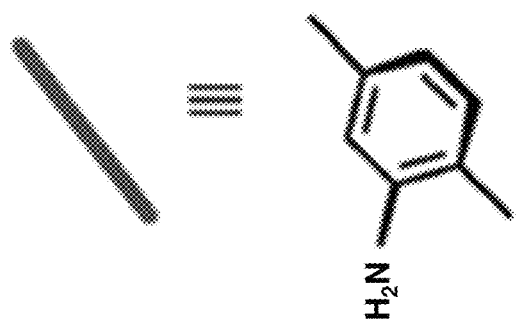
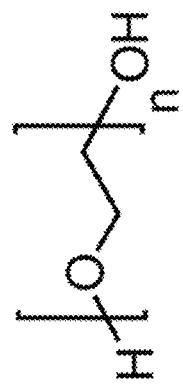
FIG. 3C
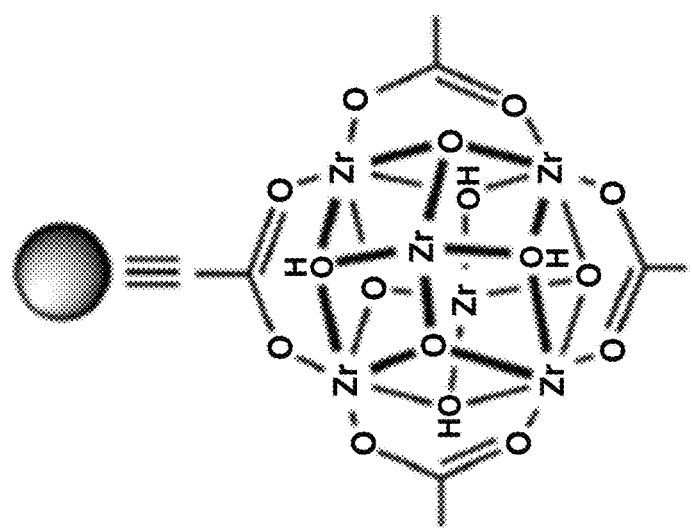

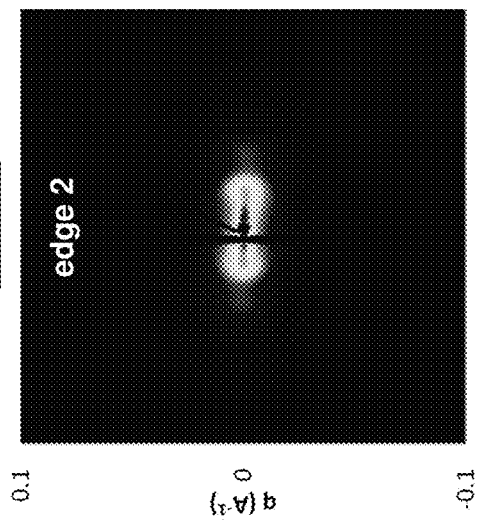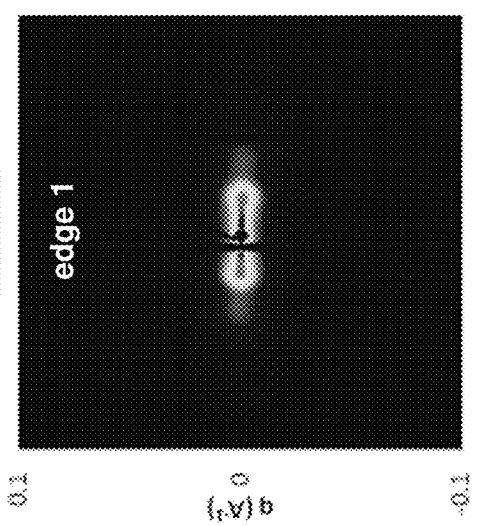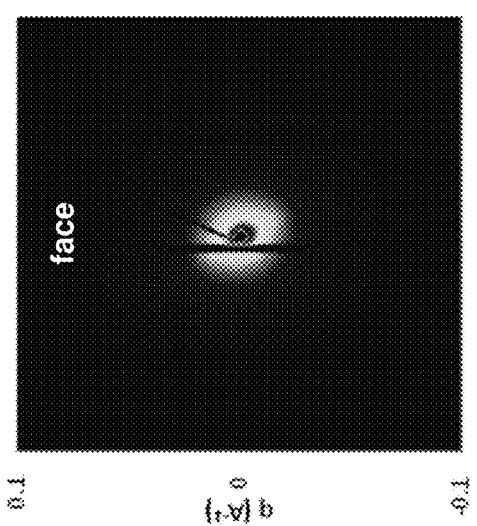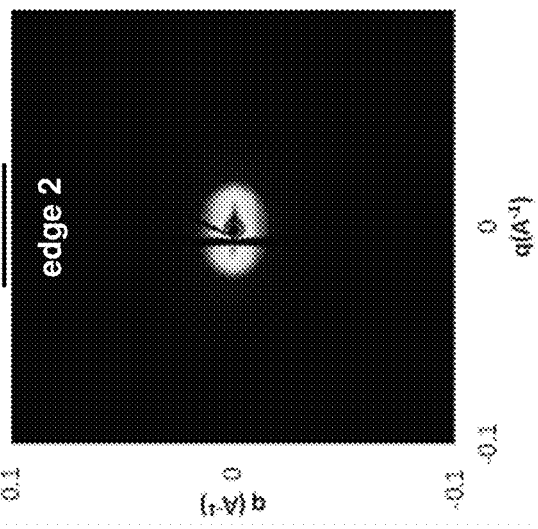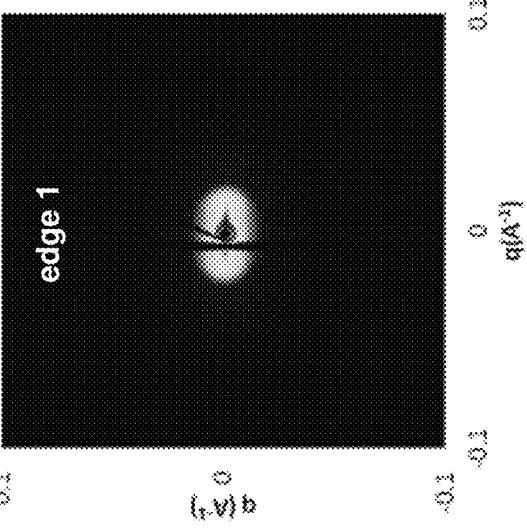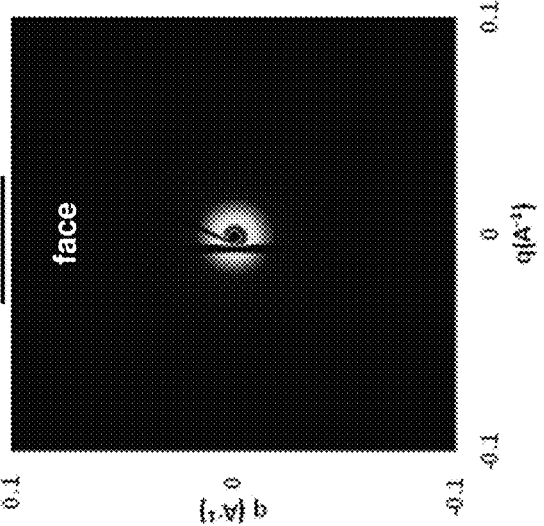
FIG. 5A face
FIG. 5B edge 1
FIG. 5C edge 2
FIG. 5D face
FIG. 5E edge 1
FIG. 5F edge 2

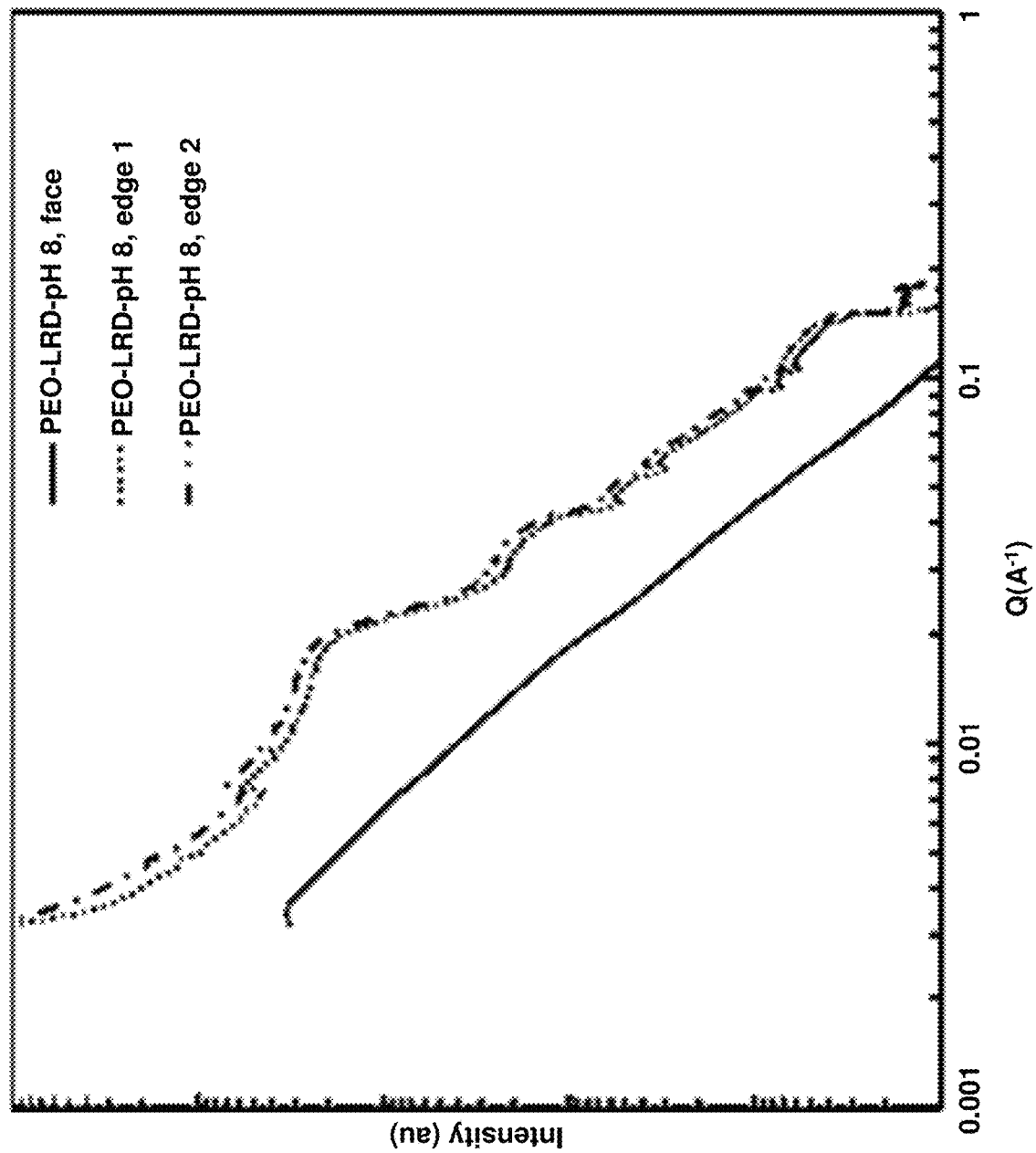

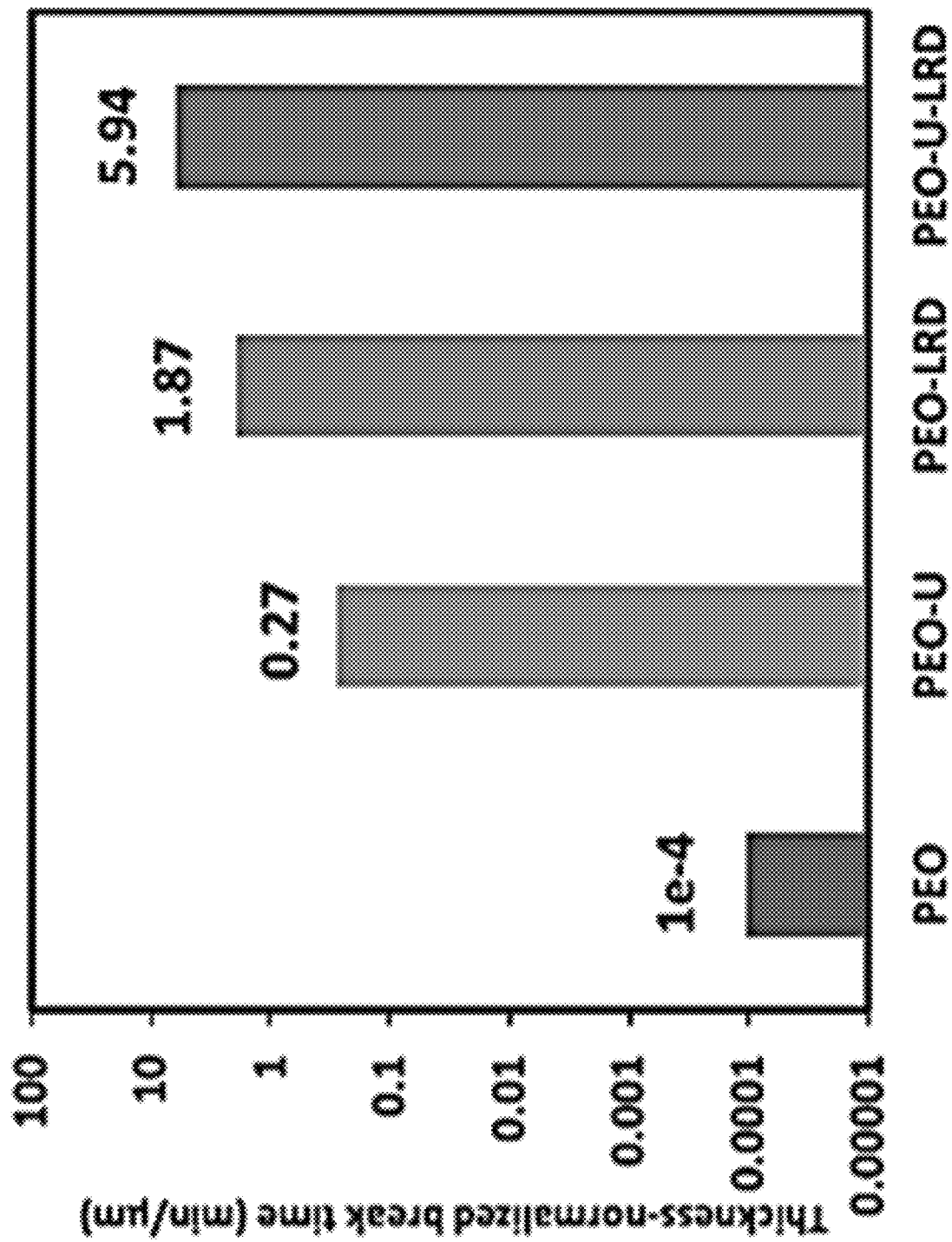

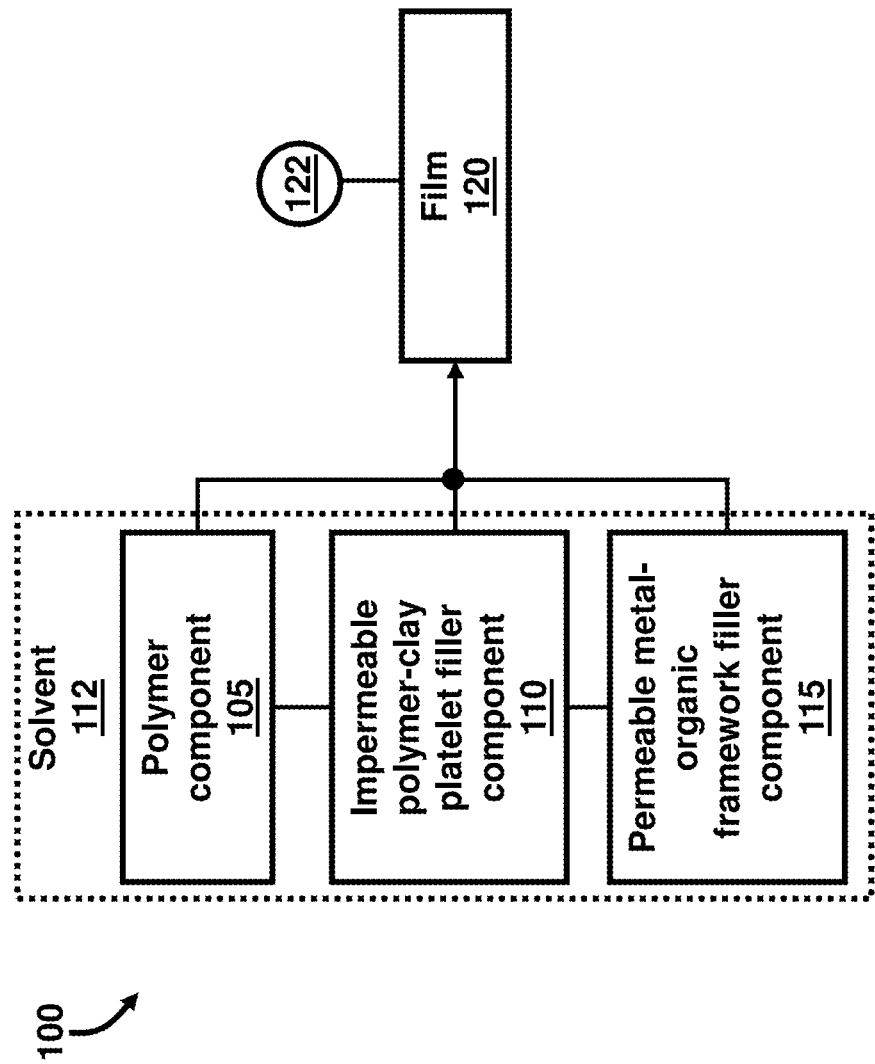

FIG. 15B

→ (A) Adjusting the pH of the solution using 0.1 M HClO$_4$ and 0.1 M NaOH — 350

FIG. 15C

→ (B) Using 1 g of the metal-organic framework filler component, 3 g of the polymer component powder, 1 g of the impermeable polymer-clay platelet filler powder, 24 mg of the NaCl, and 400 mL of the distilled water — 355

FIG. 15D

→ (C) Stirring the solution to exfoliate the impermeable polymer-clay platelet filler component — 360

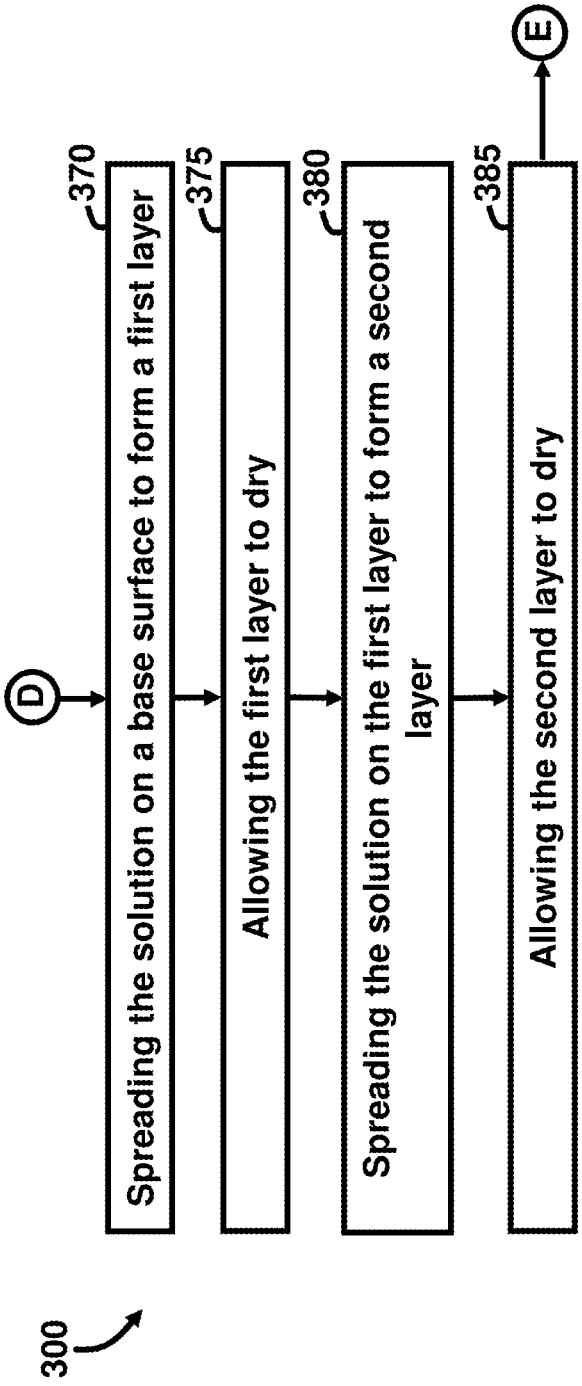

MOF-CLAY-POLYMER COMPOSITE MEMBRANE WITH DISPERSED FILLER CONSTITUENTS AND ANISOTROPICALLY-ORIENTED CLAY PLATELETS

CROSS REFERENCE TO RELATED APPLICATION

This application claims the benefit of U.S. Provisional Patent Application Ser. No. 63/213,175 filed on Jun. 21, 2021, the contents of which, in its entirety, is incorporated by reference herein.

GOVERNMENT INTEREST

The embodiments herein may be manufactured, used, and/or licensed by or for the United States Government.

BACKGROUND

Technical Field

The embodiments herein generally relate to polymer membranes, and more particularly to polymer and metal-organic framework (MOF) composite membranes.

Description of the Related Art

Polymer membranes have ubiquitous application in scenarios in which flexible barrier materials are required. It is often desired for such membranes to have a filler component incorporated when serving as a barrier material, as polymeric substrates by themselves generally present a high void volume and low surface area, often without a substantial density of reactive moieties incorporated in the native material. Filler components serve to bridge these challenges, and reactive and high-surface-area fillers such as MOFs have been heavily utilized in the industry for such a purpose. As these fillers are permeable, however, the collective barrier ability of the composite typically diminishes substantially at steady state, when the reactive sites of the permeable MOF filler component have been exhausted and subsequent degradation of material has occurred. Inclusion of multiple types of filler components in the same polymeric membrane has previously been explored for gas separation applications.

SUMMARY

In view of the foregoing, the embodiments herein provide a composite membrane comprising a polymer component; an impermeable clay platelet filler component; and a permeable metal-organic framework filler component combined with the polymer component and the impermeable clay platelet filler component to form a film, wherein the impermeable clay platelet filler component comprises an anisotropic orientation aligned parallel to a surface of the film. The polymer component may comprise polyethylene oxide. The polyethylene oxide may comprise a viscosity-averaged molecular weight of $10^6$ g/mol. The impermeable clay platelet filler component may comprise hydrous magnesium silicate clay. The permeable metal-organic framework filler component may comprise UiO-66-NH$_2$. The film may comprise a water vapor transport rate of 35 g/m$^2$/hr. The impermeable clay platelet filler component may comprise an aspect ratio having a ratio of diameter to thickness of 10 to 1 or greater. Each of the impermeable clay platelet filler component and the permeable metal-organic framework filler component may comprise at least a 20 weight percent of the film.

Another embodiment provides a method of forming a composite membrane, the method comprising providing a solvent; providing a polymer component; providing an impermeable clay platelet filler component; and combining a permeable metal-organic framework filler component with the polymer component and the impermeable clay platelet filler component in the solvent to form a film, wherein the impermeable clay platelet filler component comprises an anisotropic orientation aligned parallel to a surface of the film.

The solvent may comprise distilled water and NaCl. The polymer component may comprise polyethylene oxide. The polyethylene oxide may comprise at most 5 wt. % relative to a total amount of the distilled water in the solvent. The polymer component may comprise a polymer powder, and the impermeable clay platelet filler component may comprise an impermeable polymer-clay platelet filler powder. The method may comprise performing tip sonication of the metal-organic framework filler component in the distilled water to form a solution; adding the polymer component powder, the impermeable polymer-clay platelet filler powder, and the NaCl to the solution; and adjusting a pH of the solution to 8.0. The method may comprise adjusting the pH of the solution using 0.1 M HClO$_4$ and 0.1 M NaOH. The method may comprise using 1 g of the metal-organic framework filler component, 3 g of the polymer component powder, 1 g of the impermeable polymer-clay platelet filler powder, 24 mg of the NaCl, and 400 mL of the distilled water.

The method may comprise stirring the solution to exfoliate the impermeable clay platelet filler component. The method may comprise performing a film synthesis process comprising spreading the solution on a base surface to form a first layer; allowing the first layer to dry; spreading the solution on the first layer to form a second layer; and allowing the second layer to dry. The method may comprise repeating the film synthesis process to sequentially stack multiple layers. The impermeable clay platelet filler component may comprise hydrous magnesium silicate clay. The permeable metal-organic framework filler component may comprise UiO-66-NH$_2$.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A is a schematic of the chemical structure of LAPONITE® RD hydrous magnesium silicate clay;

FIG. 3B is a schematic of the chemical structure of UiO-66-$NH_2$;

FIG. 3C is a schematic of the chemical structure of polyethylene oxide;

FIGS. 5A through 5C are small-angle X-ray scattering (SAXS) 2D images of PEO-LRD-pH 8;

FIGS. 5D through 5F are SAXS 2D images of PEO-U-LRD-pH 8;

FIG. 6A is a graphical illustration of SAXS spectra of PEO-LRD-pH 8;

FIG. 12B is a graphical illustration showing thickness-normalized breakthrough times of various PEO based films;

FIG. 13 is a block diagram illustrating a composite membrane according to the embodiments herein;

FIGS. 15A through 15D are flow diagrams illustrating other aspects of forming a composite membrane according to the embodiments herein; and FIGS. 15E through 15F are flow diagrams illustrating a film synthesis process according to the embodiments herein.

DETAILED DESCRIPTION

Figure 1B:
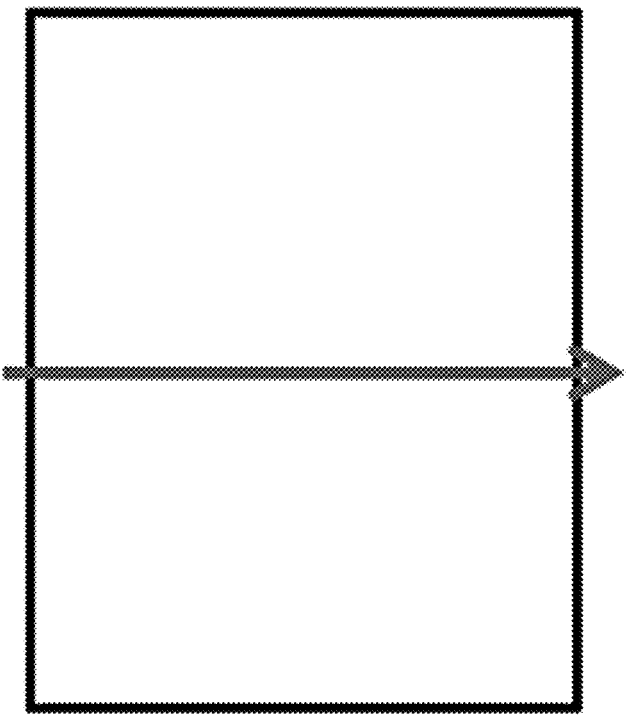
FIG. 1B is a schematic diagram illustrating a diffusion pathway of gas-phase permeant with high-aspect-ratio impermeable filler particles.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments disclosed herein are directed to a process for preparing a polymer composite membrane containing both metal-organic framework (MOF) filler components and clay platelet filler components, resulting in dispersion of both fillers and alignment of the clay platelets parallel to the surface of the film. In some examples, the baseline polymer utilized is polyethylene oxide (PEO) of viscosity-averaged molecular weight $10^6$ g/mol, the MOF is UiO-66-$NH_2$, and the clay platelet may be composed of LAPONITE® RD hydrous magnesium silicate clay (LRD; BYK Additives, Ltd.). The maintenance of alignment of the high-aspect-ratio LRD component upon incorporation of UiO-66-$NH_2$ provides for both a high-tortuosity diffusion pathway and a high-reactivity medium for interaction with permeant gas through the resulting membrane. The MOF component of this material can react with multiple chemical warfare agents (CWAs) and simulants, including but not limited to 2-chloroethyl ethyl sulfide (2-CEES), a common simulant for the percutaneous hazard mustard gas, and the MOF-clay component exhibits enhanced barrier properties against 2-CEES permeant as compared to membranes of the individual constituent fillers, as determined via testing methods described in American Standard for Testing and Materials (ASTM) F796-12. The composite material exhibits a water vapor transport rate of 35 g/m²/hr as determined via the Water Method of ASTM E96-16. This material is applicable to protective garments and equipment such as tents, shoes, and gloves. Referring now to the drawings, and more particularly to FIGS. 1A through 15F, where similar reference characters denote corresponding features consistently throughout the figures, there are shown preferred embodiments. In the drawings, the size and relative sizes of components, layers, and regions, etc. may be exaggerated for clarity.

Inclusion of an impermeable filler theoretically preserves the barrier abilities of the composite to a greater extent, even at steady state. The effective diffusivity, and by extension the permeability, of gas-phase permeant in polymer membranes is minimized upon inclusion of impermeable filler components with a high aspect ratio, defined as the ratio of its dimension parallel to the surface of the film to its dimension perpendicular to the surface of the film. Therefore, combination of both a reactive and permeable filler component with a high-aspect-ratio impermeable filler component in the same composite membrane may provide a means for generation of a high-performing barrier material. The embodiments herein combine a high-aspect-ratio impermeable filler aligned parallel to the film surface with a reactive and permeable filler component.

Figure 1A:
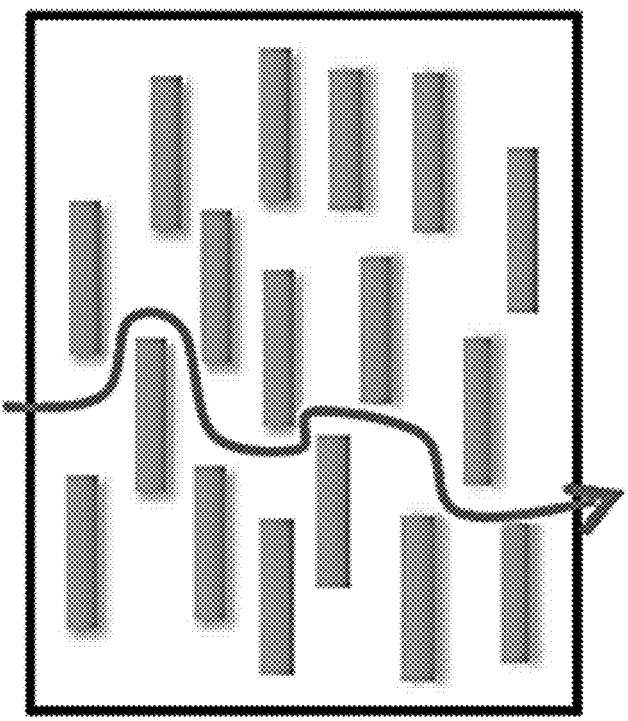
FIG. 1A is a schematic diagram illustrating a diffusion pathway of gas-phase permeant without impermeable filler particles.

Polymer composite systems with aligned impermeable fillers, often referred to as anisotropic systems, may be provided in the form of clay platelets. Several polymer-clay platelet composites may be utilized for producing anisotropic orientation parallel to the film surface, and polyethylene oxide (PEO) and LAPONITE® RD hydrous magnesium silicate clay are some examples and thus provide for a strong model system as a starting point. Conventionally, preserving alignment upon incorporation of a reactive MOF filler, however, has not been investigated, and it presents potential for disrupting the polymer-clay binding sites and interfering with the alignment mechanism. FIGS. 1A and 1B illustrate diffusion pathways of gas-phase permeant without impermeable filler particles (FIG. 1A) and with high-aspect-ratio impermeable filler particles (FIG. 1B).

The embodiments herein provide a process for the synthesis of a breathable polymer composite membrane containing high-aspect-ratio clay platelets (such as LAPONITE® RD hydrous magnesium silicate clay platelets, for example) aligned parallel to the surface of the film and a well-dispersed UiO-66-NH$_2$ metal-organic framework (MOF) component. High-aspect-ratio impermeable filler herein refers to any clay platelet filler with an aspect ratio, defined as its ratio of diameter to thickness, of 10 to 1 or greater. Determination of orientation parallel to the surface of the film refers to anisotropic systems with a Hermans orientation parameter of 0.3 or greater, as determined from azimuthal small-angle neutron scattering (SANS) scans encircling the face of the film. Breathability refers to any system with a water vapor transport rate, as determined by the Water Method of ASTM E96-16, of 5 g/m$^2$/hr or greater. "Exfoliated" material is indicative of platelets dispersed mostly through an individual state in a polymer material. The approach utilized for such a material combines the impermeable filler of clay platelets (such as LAPONITE® RD clay platelets) with the permeable filler UiO-66-NH$_2$ in the same polyethylene oxide film. The synthesis proceeds in line with previous methods utilized with PEO-LRD composites, with the exception that a precursor solution pH of 8 is used. The metric of pH 8 was determined via X-ray diffraction measurements to be the maximum pH at which UiO-66-NH$_2$ maintained full stability.

Specifically, synthesis conditions may comprise distilled water as the baseline solvent, ionic strength adjustment of the solution to 0.001 M with NaCl, and 20 weight percent of each of the constituent fillers (e.g., LAPONITE® RD hydrous magnesium silicate clay and MOF), with the polyethylene oxide content limited to 5 wt. % relative to the total amount of distilled water. The 20 weight percent parameter was utilized for each filler to balance the incorporation and influence of each component and served as an optimal design point from previous literature for generating performance benefit. The 20 weight percent guideline is a relative minima in which LRD has shown to align in PEO, and it also represents a design metric for the MOF in the vicinity of the maximum for which catastrophic loss of structural integrity can occur in the resulting film due to excessive brittleness.

In an example, synthesis may commence via tip sonication of 1 g of the MOF component in 400 mL in distilled water, followed by slow addition of 3 g of the PEO powder, 1 g of the LRD powder, and 24 mg of NaCl, respectively. The pH may be then slowly adjusted to 8.0 using 0.1 M HClO$_4$ and 0.1 M NaOH for modification. The resulting solution may be stirred vigorously for two weeks for fully exfoliating the clay component. Synthesis of the film component may then proceed via a layer-by-layer spreading technique involving 2 mL aliquots of the precursor solution being pipetted into a glass slide and spread with a wet film applicator. Drying time for each layer may be approximately 1 hour. Experimentally, a total of 30 layers were spread, yielding a total thickness of 50-75 microns for the composite films, as determined from scanning electron microscopy images of the cross section of the film. The resulting film containing PEO, LRD, and MOF is designated as PEO-U-LRD-pH 8. Films containing solely PEO and UiO-66-NH$_2$ and solely PEO and LRD may also be synthesized at a pH of 8 for comparison and can be designated as PEO-U-pH 8 and PEO-LRD-pH 8, respectively.

Figure 2:
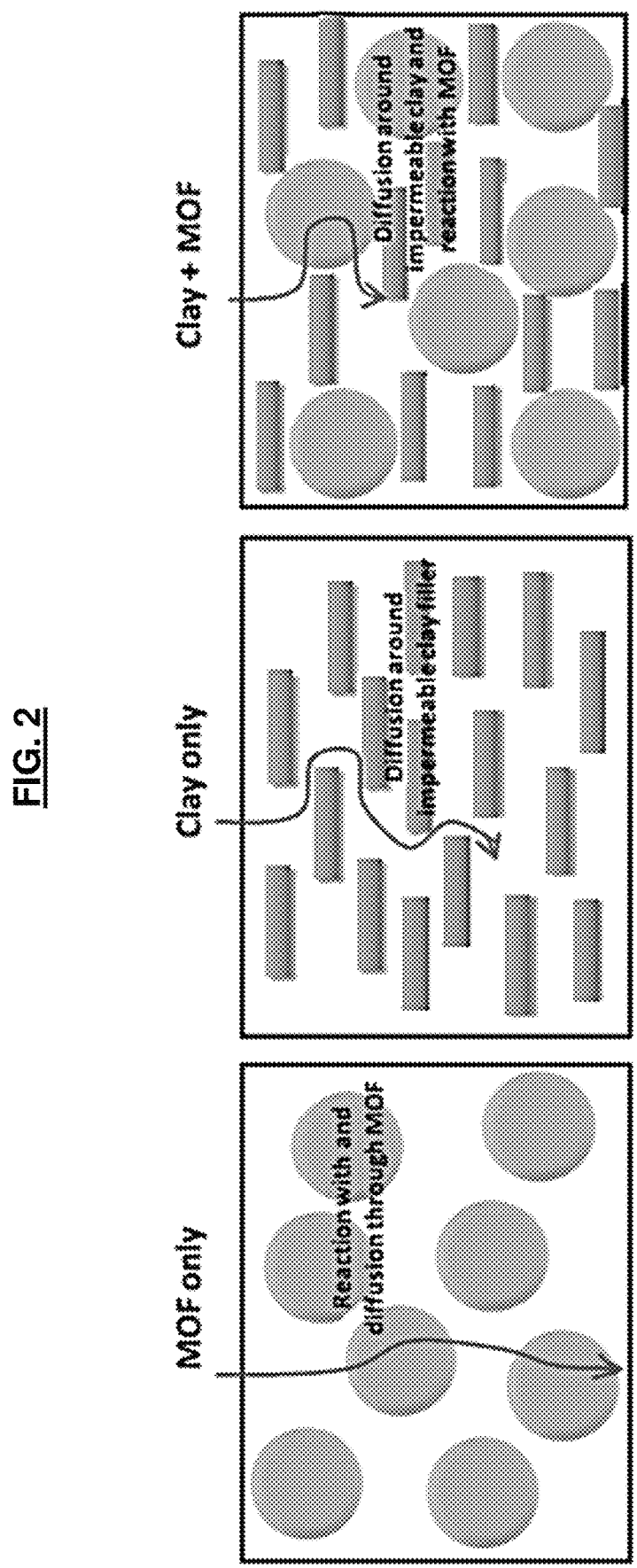
FIG. 2 is a schematic diagram illustrating the incorporation of MOFs and clay platelets into a single composite membrane in comparison to composition membranes of individual constituents.
Figure 4B:
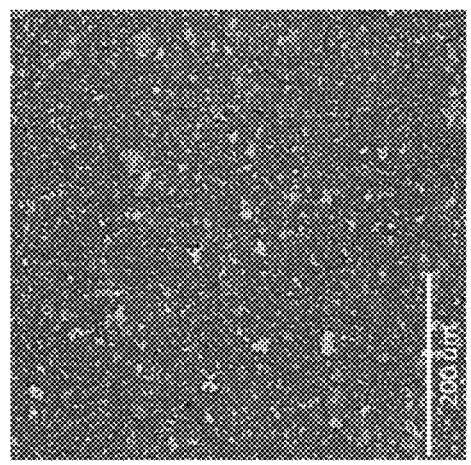
FIG. 4B is a scanning electron microscopy (SEM) image of PEO-U-LRD-pH 8.
Figure 4A:
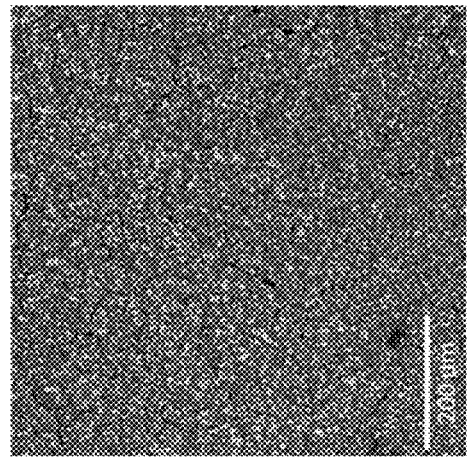
FIG. 4A is a scanning electron microscopy (SEM) image of PEO-LRD-pH 8.
Figure 6B:
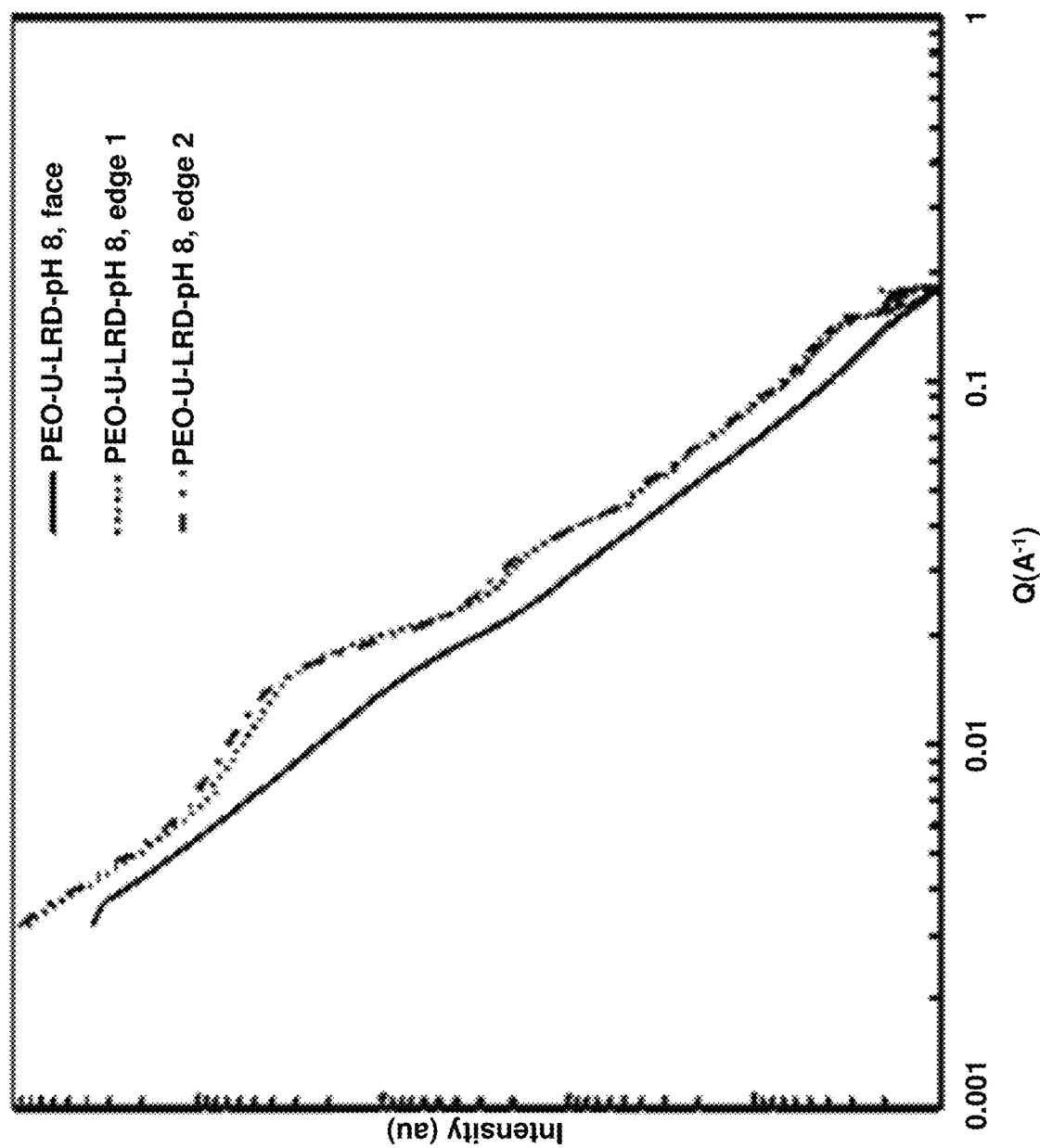
FIG. 6B is a graphical illustration of SAXS spectra of PEO-U-LRD-pH 8.
Figure 7A:
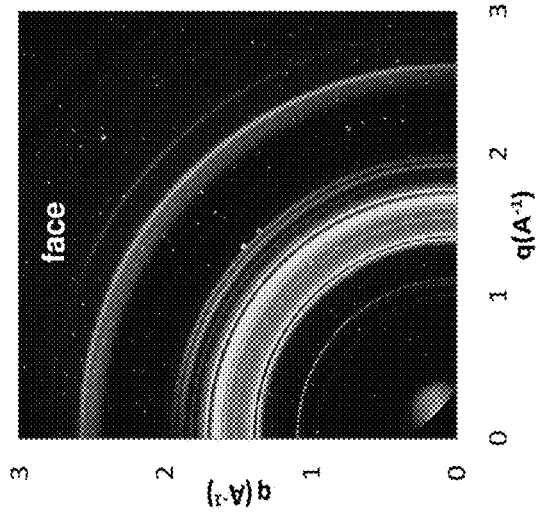
FIGS. 7A through 7C are wide-angle X-ray scattering (WAXS) 2D images of PEO-LRD-pH 8.
Figure 7B:
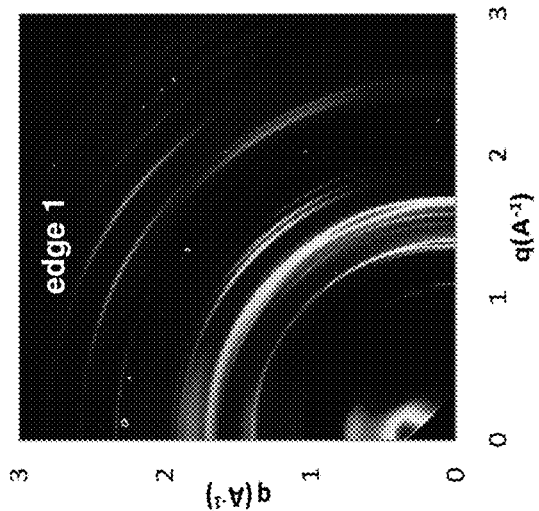
Figure 7C:
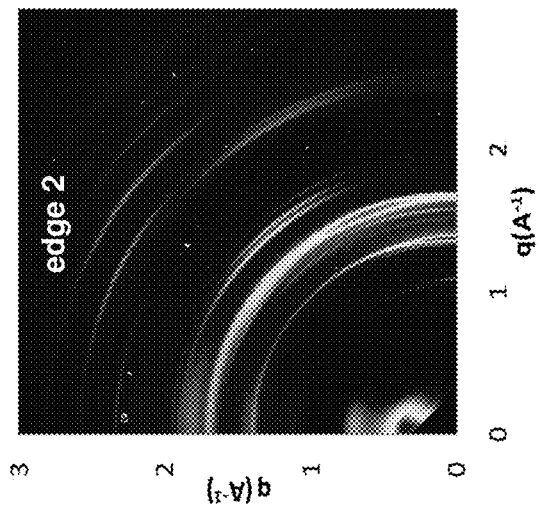
Figure 7D:
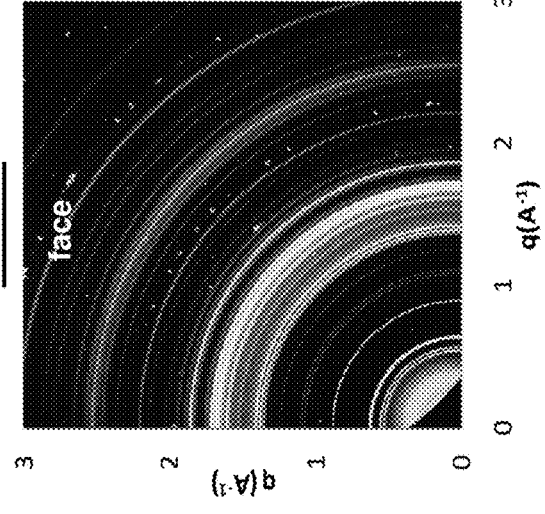
FIGS. 7D through 7F are WAXS 2D images of PEO-U-LRD-pH 8.
Figure 7E:
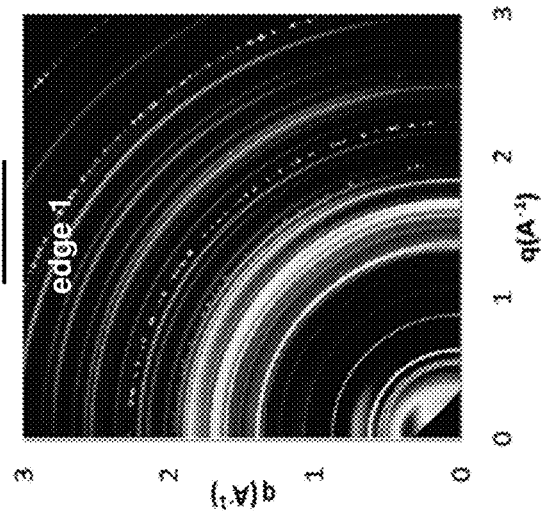
Figure 7F:
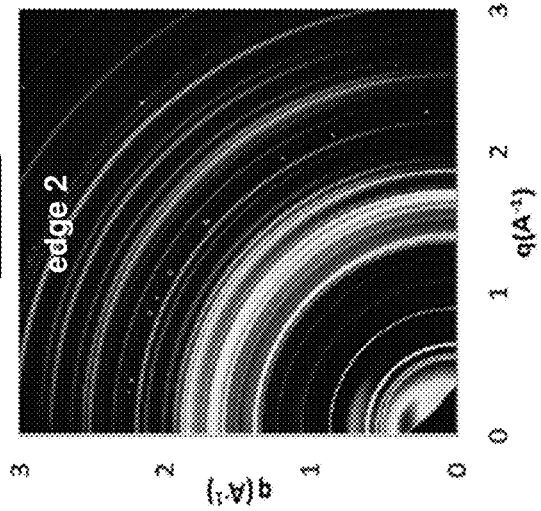

FIG. 2 is a schematic of incorporation of MOFs and clay platelets into a single composite membrane in comparison to composition membranes of individual constituents. FIG. 3A is a schematic of the chemical structure of LAPONITE® RD hydrous magnesium silicate clay. FIG. 3B is a schematic of the chemical structure of UiO-66-NH$_2$. FIG. 3C is a schematic of the chemical structure of polyethylene oxide;

Scanning electron microscopy (SEM) images of the PEO-U-pH 8 and PEO-U-LRD-pH 8 films provided in FIGS. 4A and 4B show that the MOF component maintains high dispersion even after platelet incorporation. Small-angle X-ray scattering (SAXS) 2D images comparing the PEO-LRD-pH 8 and PEO-U-LRD-pH 8 films provided in FIGS. 5A through 5F show that the experimental platelets maintain alignment parallel to the surface of the film upon incorporation of MOF into the structure. SAXS spectra in FIGS. 6A and 6B show that the scattering signatures from the edge planes of the films maintain a unique profile from the scattering signature from the face plane and show a peak in the range of 0.02 A$^{-1}$, corresponding to scattering from a structure of dimension in the range of 30 nm, the nominal diameter of LRD platelets. Specifically, the peak for the film containing solely clay platelets exhibits a peak at 0.0185 A$^{-1}$, and the peak for the film containing clay platelets and MOF exhibits a peak at 0.0135 A$^{-1}$; these correspond to d-spacing values of 32 nm and 48 nm, respectively.

Figure 8A:
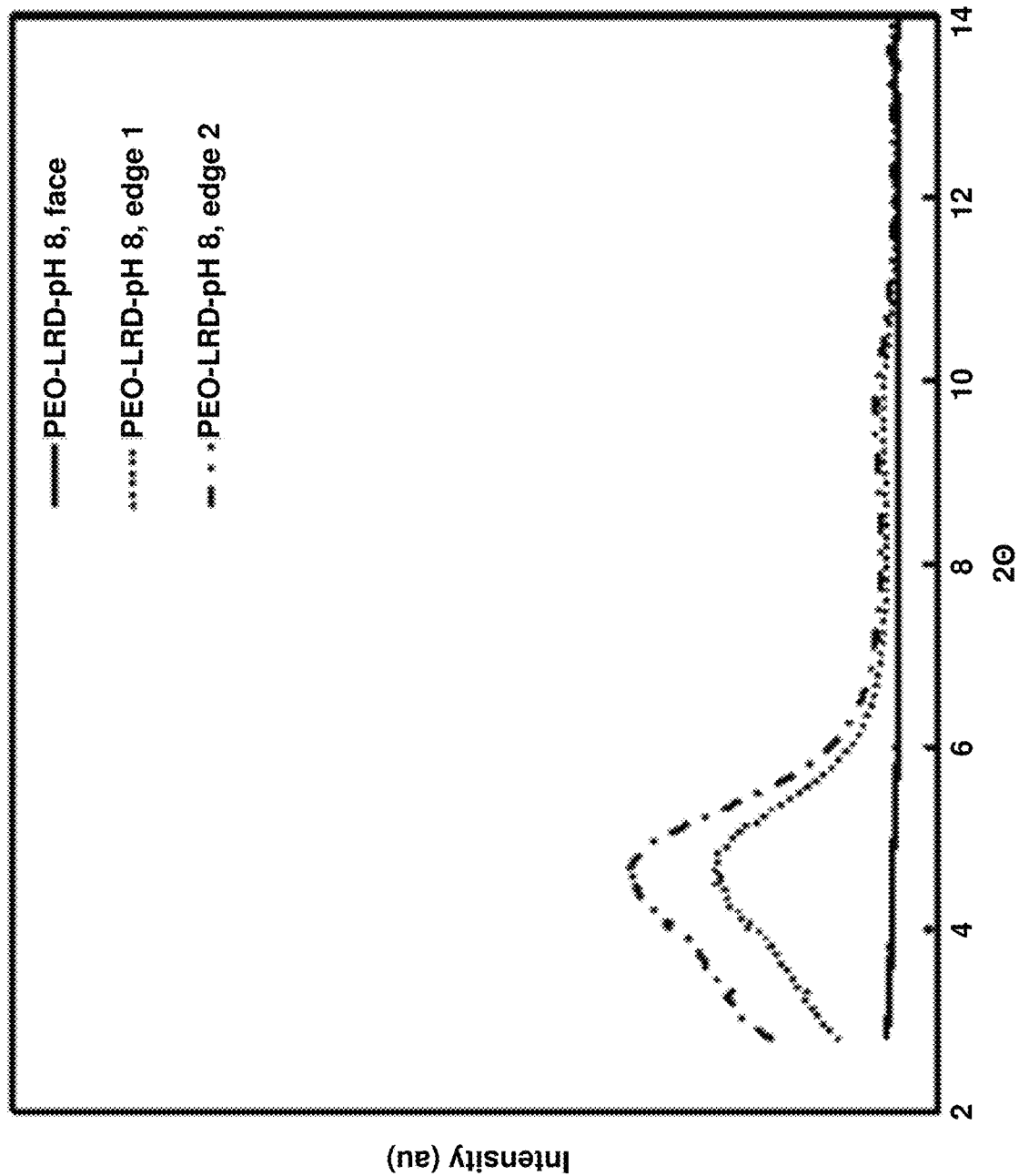
FIG. 8A is a graphical illustration of WAXS spectra of PEO-LRD-pH 8.
Figure 8B:
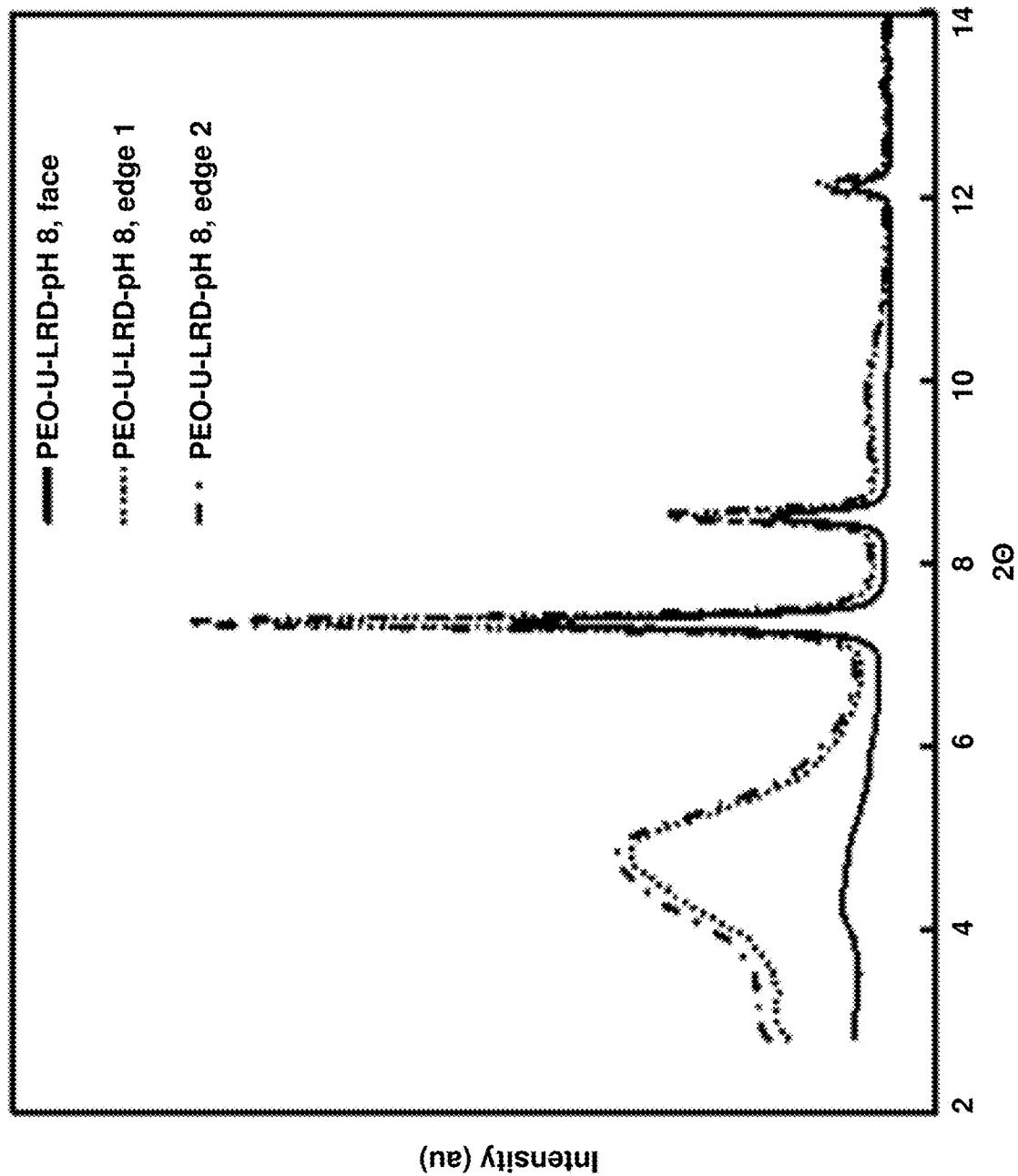
FIG. 8B is a graphical illustration of WAXS spectra of PEO-U-LRD-pH 8.
Figure 9:
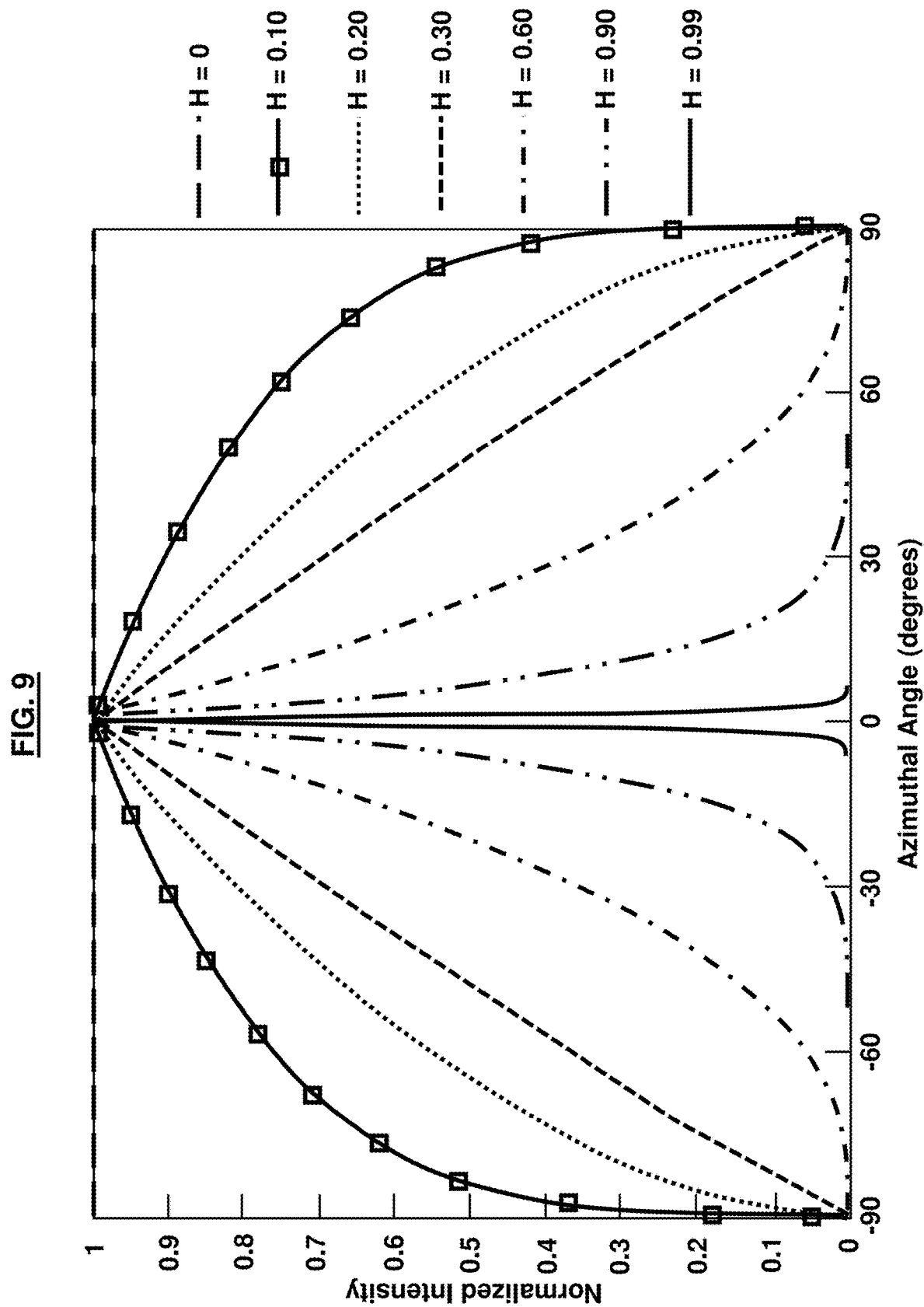
FIG. 9 is a graphical illustration of selected intensity versus azimuthal angle profiles for different values of the Hermans orientation parameter.

Wide-angle x-ray scattering (WAXS) 2D images in FIGS. 7A through 7F and FIGS. 8A and 8B show that platelet layers maintain bulk alignment parallel to the film surface. WAXS spectra in FIGS. 8A and 8B show that the MOF remains structurally intact upon incorporation into the film (represented by the peaks at 2-theta around 7, 9, and 12 degrees) and that the LRD platelet interlayer spacing, reflected in the peak around 2-theta of 5 degrees, remains maintained and unique to the edge scattering signatures, further reflecting preservation of alignment.

Figure 10A:
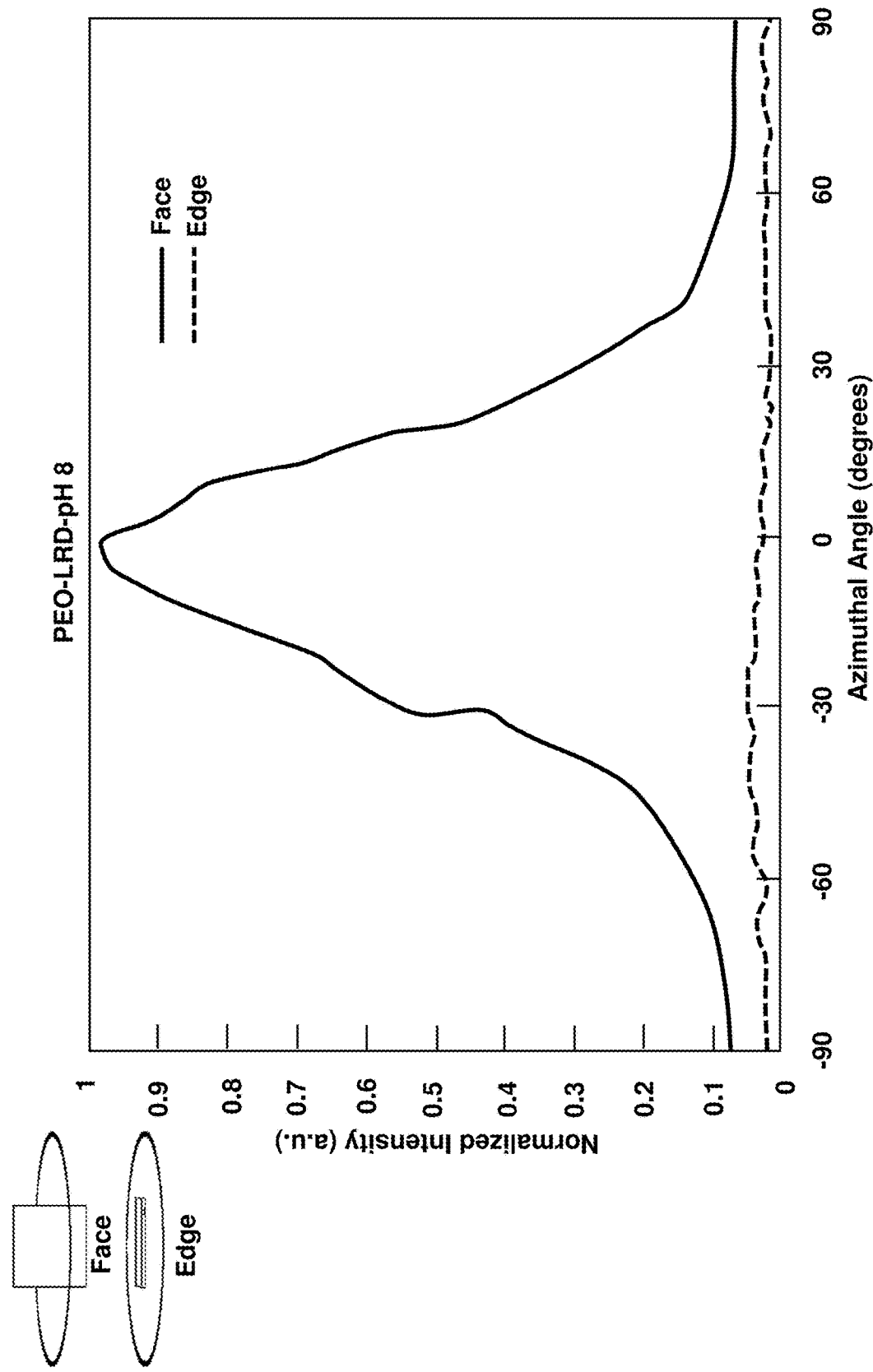
FIG. 10A is a small-angle neutron scattering (SANS) azimuthal scan of PEO-LRD-pH 8.
Figure 10B:
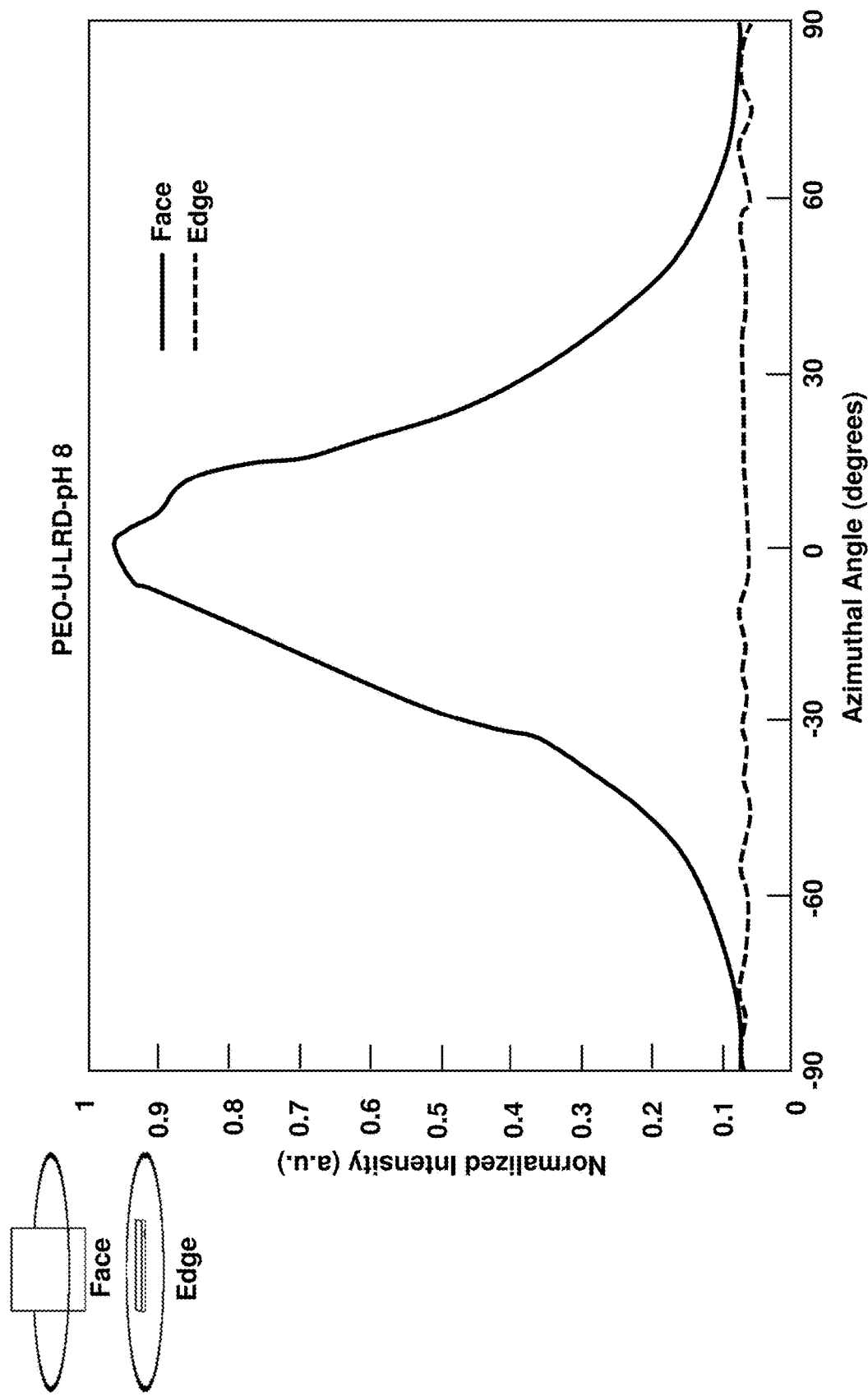
FIG. 10B is a SANS azimuthal scan of PEO-U-LRD-pH 8.
Figure 11A:
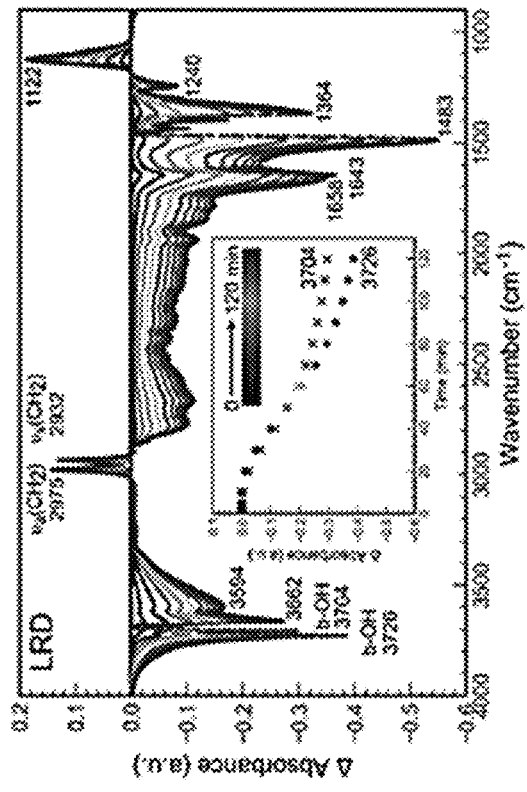
FIGS. 11A through 11D are diffuse reflectance infrared Fourier transform spectroscopy (DRIFTS) spectra (FIG. 11A) of the PEO-U-LRD-pH 8 film and its constituent components (FIGS. 11B through 11D) against 2-chloroethyl ethyl sulfide (CEES)
Figure 11B:
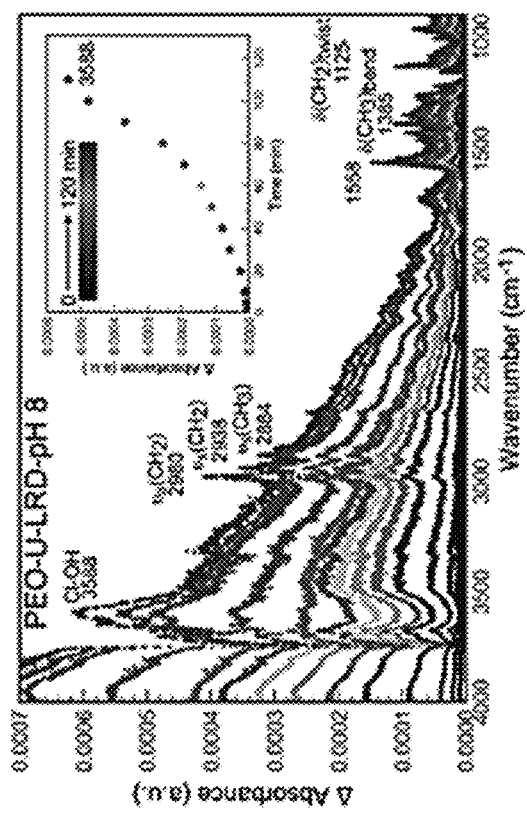
Figure 11C:
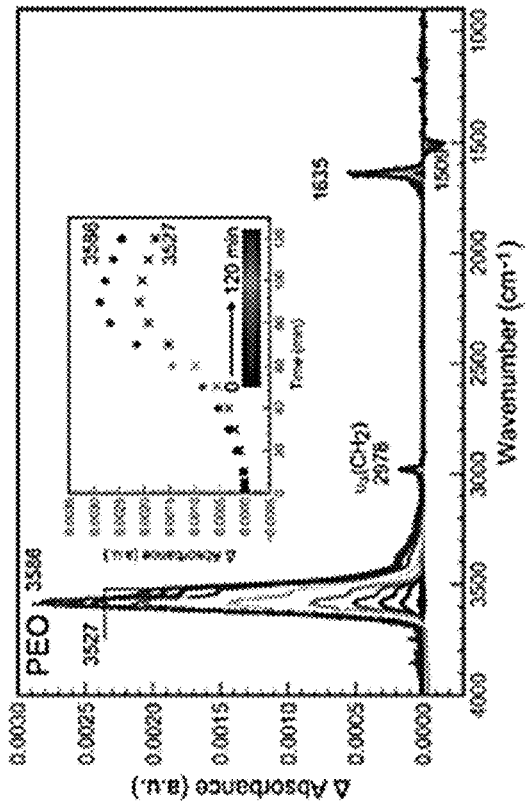
Figure 11D:
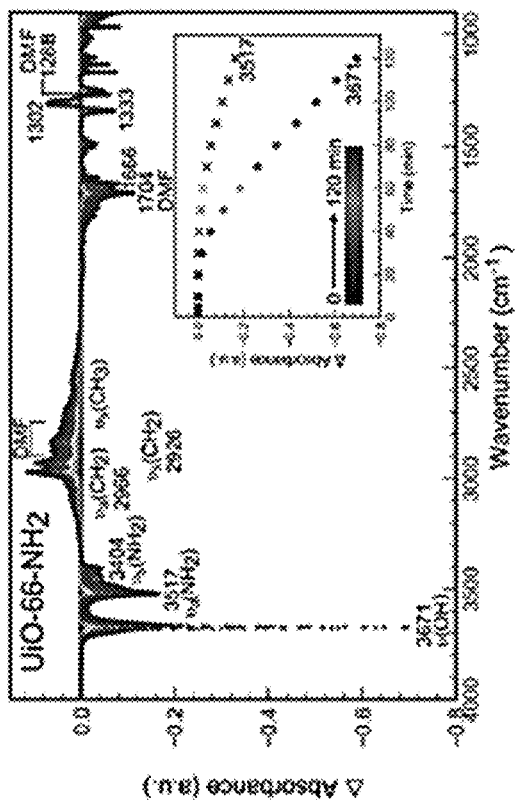
Figure 12A:
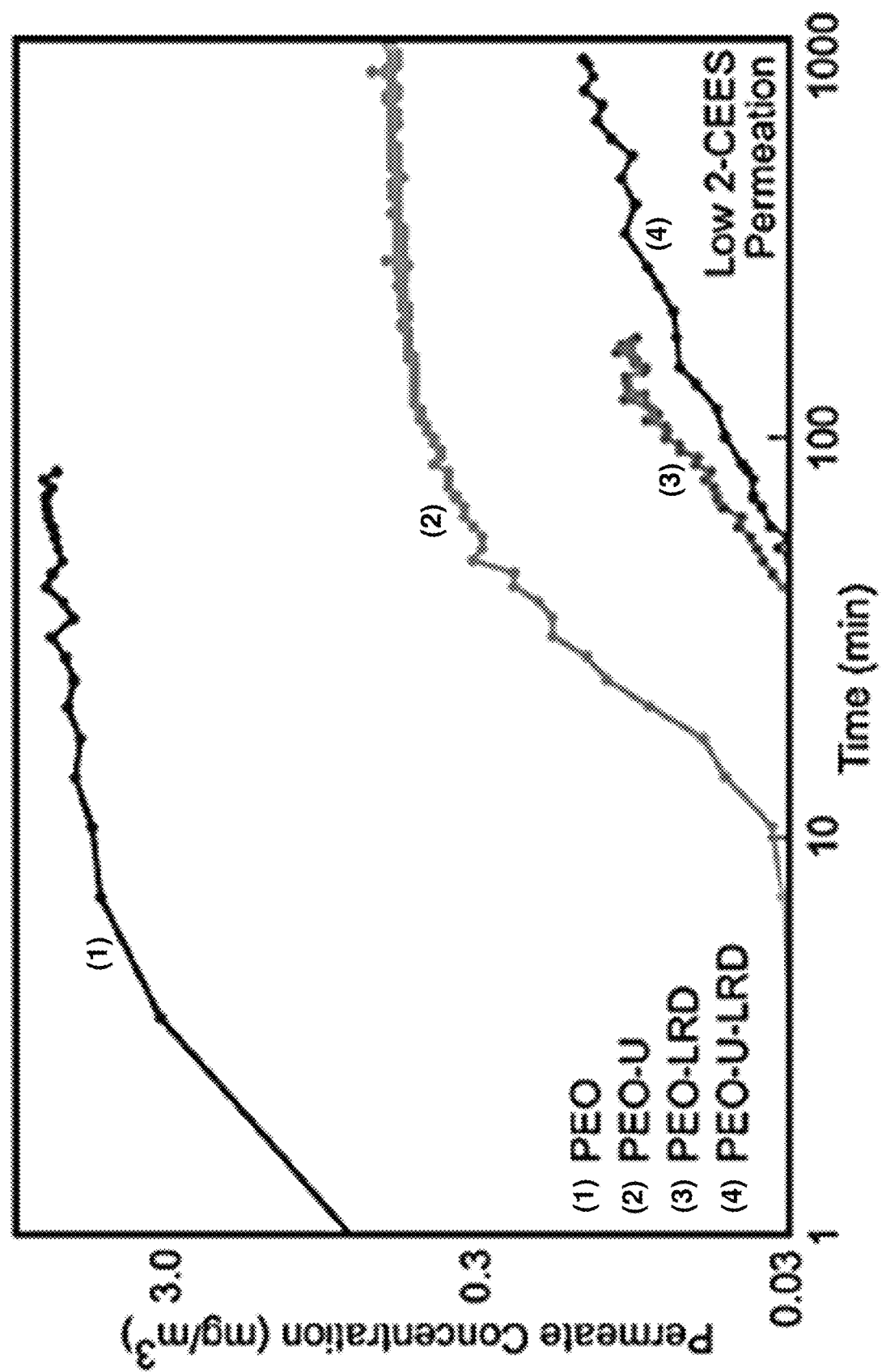
FIG. 12A is a graphical illustration showing permeation data of 2-CEES against PEO based films.

Small-angle neutron scattering (SANS) azimuthal scans in FIGS. 10A and 10B parameterize the degree of alignment of the platelets and show that the alignment parameter is similarly maintained upon platelet incorporation. The Hermans orientation parameter, H, is used to define alignment from the intensity versus azimuthal angle data, is defined in Equations (1) and (2) and is exemplified for various alignment ranges in FIG. 9. The Hermans parameters for the azimuthal scans encircling the face of the films were 0.408 for PEO-LRD-pH 8 and 0.339 for PEO-U-LRD-pH 8.

$$H = \frac{3\langle\cos^2\phi\rangle - 1}{2} \quad (1)$$

$$\langle\cos^2\phi\rangle = \frac{\int_0^{90°} I\cos^2\phi \, \sin\phi \, d\phi}{\int_0^{90°} I \sin\phi \, d\phi} \quad (2)$$

The chemical interaction of the membrane and constitutive components may be analyzed using diffuse reflectance infrared Fourier transform spectroscopy (DRIFTS). With a known reaction chemistry of 2-CEES with UiO-66-NH$_2$, and DRIFTS experiments of 2-CEES on the composite film as well as LRD, UiO-66-NH$_2$, and PEO in a powder form may be performed to provide context to 2-CEES reactivity of all constitutive filler components in the films, as shown in FIGS. 11A through 11D. Peak assignments are made based on known assessments of 2-CEES on silica, 2-CEES in the gas phase, and density functional theory calculations of the infrared spectra of 2-CEES.

The interaction of 2-CEES with LRD likely involves dispersion forces from the hydrocarbon moieties, and the electronegative S and Cl atoms of 2-CEES are expected to provide a means for stronger covalent interactions, with the Cl atom interactions expected to be stronger than the S atoms. LRD presents three distinct metal oxide species on its surface that are hydrogen bond acceptors and are expected to interact with the chlorine atom of 2-CEES, with MgOx and CaOx species expected to interact more strongly than SiOx species. The majority of the LRD surface contains silica species, for which adsorption with 2-CEES is found to proceed via hydrogen bonding of the chlorine or thioether moieties to surface silanol groups but not both moieties simultaneously, which is reflected in the DRIFTS spectra. It is seen that while LRD represents a nonreactive filler, it does present some surface adsorption, as peak generation is shown around 2978, 2943, and 1122 cm−1, corresponding to $\upsilon(CH2)$as, $\upsilon(CH3)$as, and $\omega(S—CH2)$ modes of 2-CEES, respectively. Negative features at 3726, 3704, 3662, and 1643 $cm^{-1}$ are consistent with surface hydroxyl groups from silica, magnesia, and adsorbed water hydrogen bonding to 2-CEES. Over the course of 2 h of dosing, there is a linear reduction in hydroxyl groups until it begins to plateau near the end of the dosing period. Likewise, sharp declines are observed in the UiO-66-$NH_2$ sample at 3671, 3517, and 3404 $cm^{-1}$ that are assigned to OH stretching modes and the asymmetric and symmetric stretching modes of $NH_2$, respectively. There are observed increases in the region between 3000 and 2500 $cm^{-1}$, which in addition to the observed $\upsilon(CH2)$, $\upsilon(CH3)$, and $\omega(SCH2)$ modes of 2-CEES observed in the LRD powder are evidence of peaks related to solvent dimethyl formamide (DMF) that remains in the pores of UiO-66-$NH_2$ from synthesis.

PEO, on the other hand, displays very few declines in vibrational modes, with the exception at 1509 $cm^{-1}$, but large gains in higher wavenumber modes. This may be attributed to the unreactive nature of PEO with 2-CEES. PEO displays an abundance of hydrocarbon peaks, which may explain the absence of $\upsilon(CH2)$ s peaks around 2930 $cm^{-1}$. Degradation of the polymer would be accompanied by observable declines in vibrational modes. As this is not observed for the most part, this may be attributed to the large peak increases at higher wavenumbers to the physisorption of 2-CEES through the formation of hydrogen bonding with the sulfur and chlorine moieties. Previous studies have shown that hydrogen bonding of 2-CEES will occur through either the chlorine or sulfur moieties, and these studies have predicted that the Cl moiety is the weaker interaction and would therefore be observed at higher wavenumbers due to the more negative charge residing on the S atom compared to Cl.

The peaks at 3527 and 3586 $cm^{-1}$ correspond to the physisorption of Cl and S, respectively, which are also observed in the composite film. Moreover, the largest peak that is observed in the gas-phase spectra of 2-CEES is the peak that occurs at 696 $cm^{-1}$ for the PEO sample (shifted from the gas phase position of 717 $cm^{-1}$). This peak is only observed on the PEO powder, indicating that 2-CEES pools at the powder surface and is unreacted. The stability of the PEO powder against degradation upon exposure is further validated by the lack of a $\nu(CH3)$ mode occurring at ~2930 $cm^{-1}$. The PEO-U-LRD composite material exhibits peaks reflecting all constitutive components. When accounting for the slightly shifting background that is evidenced at the ultralow differentials observed on the polymer, declines at 3670 and 3620 $cm^{-1}$ reflecting the asymmetric and symmetric $NH_2$ stretching modes of UiO-66-$NH_2$ are observed. This confirms that 2-CEES is still able to chemically interact with the MOF component after its incorporation into the composite membrane. A peak at 3527 $cm^{-1}$ corresponds to physisorption of Cl and S on the PEO substrate, and asymmetric and symmetric CH2 stretching modes in the 2800-3000 $cm^{-1}$ range are also found on baseline LRD and UiO-66-$NH_2$. Peaks at 1558 and 1125 $cm^{-1}$ have analogously been observed in PEO and LRD, respectively, and the latter has been assigned to $\delta(CH2)$ twist modes.

Permeation data of the films, including a baseline PEO film, against 300 $mg/m^3$ concentration of 2-CEES applied per specifications in American Society for Testing and Material (ASTM) standard F739-12, in depicted in FIGS. 11A through 11D. All films depicted had thicknesses in the 50-75 micron range. Results show enhanced barrier performance of the composite membrane with UiO-66-$NH_2$ and LRD as compared with composite films of the individual constituents, especially when normalized to adjust for slightly differing thicknesses by dividing the breakthrough time by the square of the film thickness.

The embodiments herein provide a composite membrane comprising a metal-organic framework and clay platelet component that maintains dispersion of both constituent fillers and alignment of the clay platelets. The polymer composite membranes may be used as a protective barrier against 2-CEES. The constituent filler components in the polymer composites may interact with 2-CEES. The embodiments herein further provide a process by which a synthetic hectorite is combined with a metal-organic framework within the same polymeric membrane.

The composite membrane contains the feature of an alignment of the clay platelets being parallel to the surface of the film upon MOF incorporation, defined as possessing a Hermans orientation parameter of 0.3 or greater when measured via azimuthal small-angle neutron scattering scans. In an example, the polymer composite interacts with 2-CEES in a manner by which the active material is utilized to a greater extent. According to some examples, the membrane may comprise polyethylene oxide (molecular weight $10^6$ g/mol) as the baseline polymer. The membrane may comprise of 20 weight percent of LAPONITE® RD hydrous magnesium silicate clay and 20 weight percent of UiO-66-$NH_2$.

In an example, the synthesis technique by which the membrane is generated is a layer-by-layer spreading process using a wet film applicator on a glass slide. As synthesized, roughly 30 layers may be used to produce a film of 50 microns in thickness for the composite membrane containing both metal-organic framework and clay platelet components. According to the embodiments herein, composite membranes maintain stability upon exposure to water vapor in a 100% relative humidity environment.

FIG. 13 is a block diagram illustrating a composite membrane 100 comprising a polymer component 105; an impermeable clay platelet filler component 110; and a permeable metal-organic framework filler component 115 combined with the polymer component 105 and the impermeable clay platelet filler component 110 in a solvent 112 to form a film 120, wherein the impermeable clay platelet filler component 110 comprises an anisotropic orientation aligned parallel to a surface 122 of the film 120. The polymer component 105 may comprise polyethylene oxide. The polyethylene oxide may comprise a viscosity-averaged molecular weight of $10^6$ g/mol. The impermeable clay platelet filler component 110 may comprise hydrous magnesium silicate clay. The permeable metal-organic framework filler component 115 may comprise UiO-66-NH$_2$. The film 120 may comprise a water vapor transport rate of 35 g/m$^2$/hr. The impermeable clay platelet filler component 110 may comprise an aspect ratio having a ratio of diameter to thickness of 10 to 1 or greater. Each of the impermeable clay platelet filler component 110 and the permeable metal-organic framework filler component 115 may comprise at least a 20 weight percent of the film 120.

Figure 14:
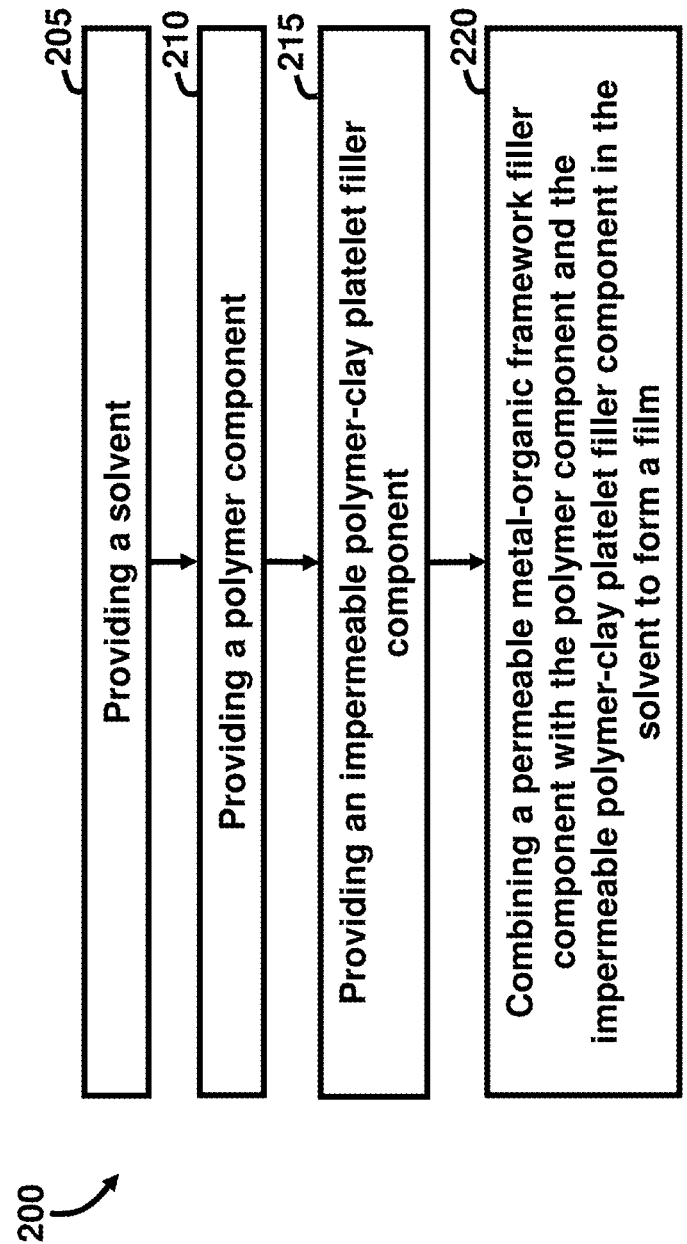
FIG. 14 is a flow diagram illustrating a method of forming a composite membrane according to the embodiments herein.

FIG. 14 is a flow diagram illustrating a method 200 of forming a composite membrane 100, the method 200 comprising providing (205) a solvent 112; providing (210) a polymer component 105; providing (215) an impermeable clay platelet filler component 110; and combining (220) a permeable metal-organic framework filler component 115 with the polymer component 105 and the impermeable clay platelet filler component 110 in the solvent 112 to form a film 120, wherein the impermeable clay platelet filler component 110 comprises an anisotropic orientation aligned parallel to a surface 122 of the film 120.

The solvent 112 may comprise distilled water and NaCl. The polymer component 105 may comprise polyethylene oxide. The polyethylene oxide may comprise at most 5 wt. % relative to a total amount of the distilled water in the solvent 112. The polymer component 105 may comprise a polymer powder, and the impermeable clay platelet filler component 110 may comprise an impermeable polymer-clay platelet filler powder.

Figure 15A:
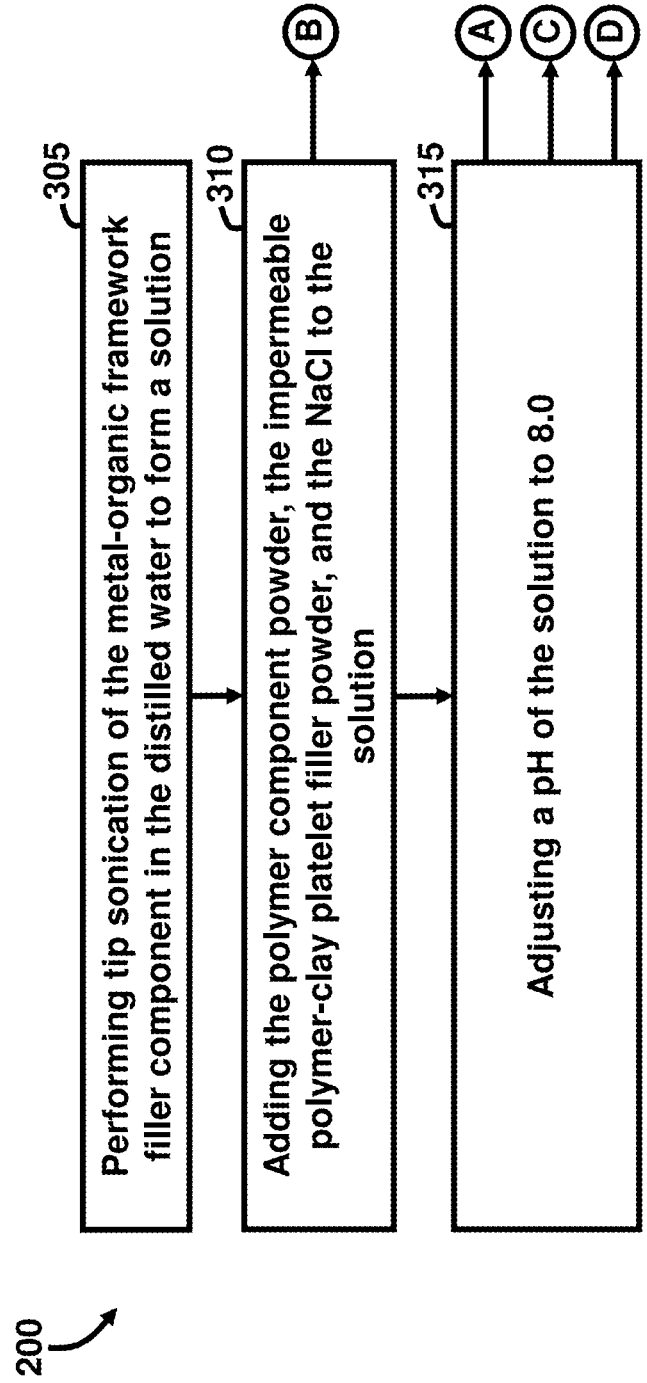

FIG. 15A is a flow diagram illustrating that the method 200 may comprise performing (305) tip sonication of the metal-organic framework filler component in the distilled water to form a solution; adding (310) the polymer component powder, the impermeable polymer-clay platelet filler powder, and the NaCl to the solution; and adjusting (315) a pH of the solution to 8.0. As shown in FIG. 15B, the method 200 may comprise adjusting (350) the pH of the solution using 0.1 M HClO$_4$ and 0.1 M NaOH. As shown in FIG. 15C, the method 200 may comprise using (355) 1 g of the metal-organic framework filler component, 3 g of the polymer component powder, 1 g of the impermeable polymer-clay platelet filler powder, 24 mg of the NaCl, and 400 mL of the distilled water. As shown in FIG. 15D, the method 200 may comprise stirring (360) the solution to exfoliate the impermeable clay platelet filler component 110.

The method 200 may comprise performing a film synthesis process 300, shown in the flow diagram of FIG. 15E, wherein the film synthesis process 300 comprises spreading (370) the solution on a base surface to form a first layer; allowing (375) the first layer to dry; spreading (380) the solution on the first layer to form a second layer; and allowing (385) the second layer to dry. The method 200 may comprise repeating (390) the film synthesis process 300 to sequentially stack multiple layers as indicated in FIG. 15F. The impermeable clay platelet filler component 110 may comprise hydrous magnesium silicate clay. The permeable metal-organic framework filler component 115 may comprise UiO-66-NH$_2$.

Experimentally, a synergistic performance of the composite membrane 100 is provided in terms of breakthrough time in a 2-CEES permeation experiment as compared to films of equal thickness composed of the individual filler components 110, 115. Moreover, the embodiments herein provide a high water vapor transport rate (WVTR) of the composite membrane 100, in excess of 30 g/m$^2$/hr, for both the films with platelets only and the films with platelets and MOF, with MOF incorporation adding roughly 10% greater WVTR to the composite membrane. In some examples, the composite membrane 100 provided by the embodiments herein may be used as a barrier coating for tents, boots, and gloves. Furthermore, the presence of the composite filler components 110, 115 aids as a reactive and permselective barrier material.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A composite membrane, comprising:
   a polymer component;
   an impermeable clay platelet filler component; and
   a permeable metal-organic framework filler component combined with the polymer component and the impermeable clay platelet filler component to form a film, wherein the metal-organic framework filler, the polymer component, and the impermeable clay platelet filler component are present in a 1:3:1 ratio,
   wherein the impermeable clay platelet filler component comprises an anisotropic orientation aligned parallel to a surface of the film and having a Hermans orientation parameter of 0.3 or greater.

2. The composite membrane according to claim 1, wherein the polymer component comprises polyethylene oxide.

3. The composite membrane according to claim 2, wherein the polyethylene oxide comprises a viscosity-averaged molecular weight of 10$^6$ g/mol.

4. The composite membrane according to claim 1, wherein the impermeable clay platelet filler component comprises hydrous magnesium silicate clay.

5. The composite membrane according to claim 1, wherein the permeable metal-organic framework filler component comprises UiO-66-NH$_2$.

6. The composite membrane according to claim 1, wherein the film comprises a water vapor transport rate of 35 g/m$^2$/hr.

7. The composite membrane according to claim 1, wherein the impermeable clay platelet filler component comprises an aspect ratio having a ratio of diameter to thickness of 10 to 1 or greater.

8. The composite membrane according to claim 1, wherein each of the impermeable clay platelet filler component and the permeable metal-organic framework filler component comprise at least a 20 weight percent of the film.

* * * * *